United States Patent [19]

Spanel et al.

[11] 4,115,659
[45] Sep. 19, 1978

[54] ELECTROACOUSTICAL TELEPHONE ADAPTER

[75] Inventors: Abram N. Spanel, 344 Stockton St., Princeton, N.J. 08540; Leonard F. Shepard, Dover, Del.

[73] Assignee: Abram N. Spanel, Princeton, N.J.

[21] Appl. No.: 807,104

[22] Filed: Jun. 16, 1977

[51] Int. Cl.$^2$ .................. H04M 9/08; H04M 1/21
[52] U.S. Cl. .............. 179/1 HF; 179/1 MF; 179/2 C; 179/2 TC
[58] Field of Search ............... 179/2 C, 1 C, 1 HF, 179/1 MF, 2 TC, 100 L, 1 VC; 181/194, 130

[56] References Cited

U.S. PATENT DOCUMENTS

| | | | |
|---|---|---|---|
| 2,580,439 | 1/1952 | Kock | 179/1 MF |
| 3,189,690 | 6/1965 | Millett | 179/1 VC |
| 3,189,691 | 6/1965 | Simpson | 179/1 VC |
| 3,887,771 | 6/1975 | Spanel | 179/1 C |

FOREIGN PATENT DOCUMENTS 2,260,401  6/1974  Fed. Rep. of Germany ....... 179/1 HF

OTHER PUBLICATIONS

"The 4A Speakerphone-A Hands-Down Winner," G. Reichard et al., Bell Lab. Record (USA), vol. 51, No. 8, Sep. 1973, pp. 233–237.

*Primary Examiner*—Kathleen H. Claffy
*Assistant Examiner*—Kenneth A. Chayt
*Attorney, Agent, or Firm*—J. Rodman Steele, Jr.

[57] ABSTRACT

A telephone adapter for hands-free telephony, adapted for use with a telephone handset having structure including an earpiece, comprising: a transmit signal path comprising, in series, a microphone, amplification means, disabling means and a transducer; a receive signal path having means for amplifying sound energy from said earpiece, said receive path comprising, in series, a coupler, amplification means, disabling means and speaker means; bias means for maintaining said transmit path in an active state when no signals are present; and, means for interrupting said circuit paths in a complementary manner.

29 Claims, 7 Drawing Figures

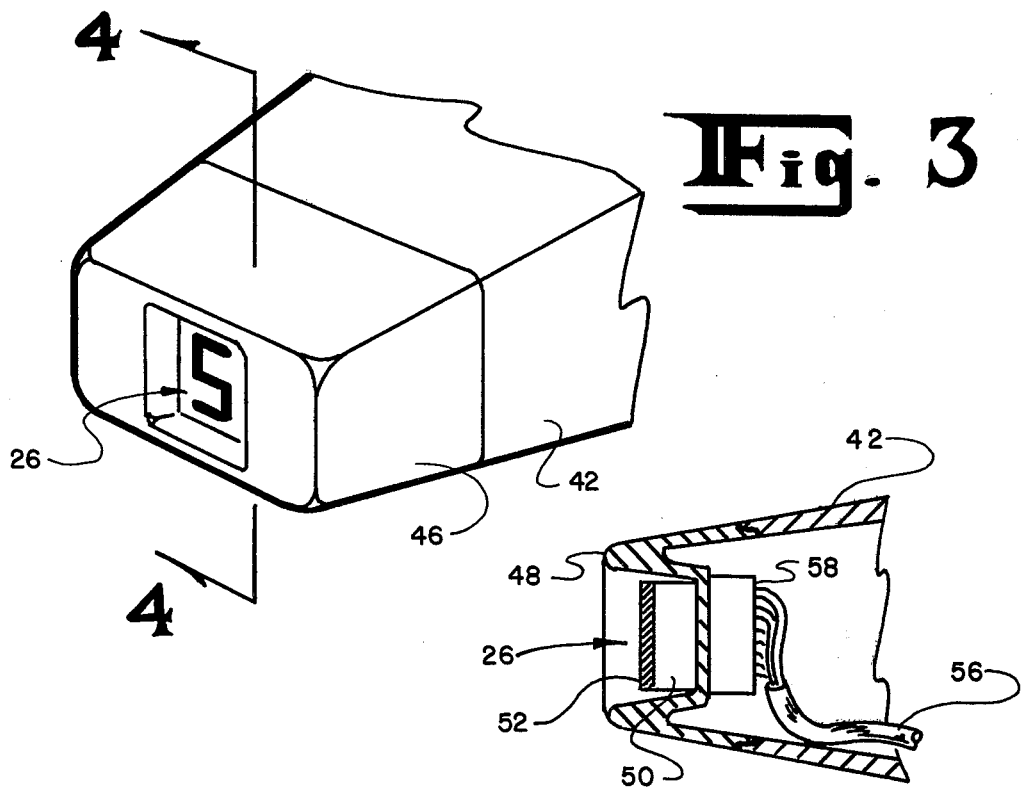
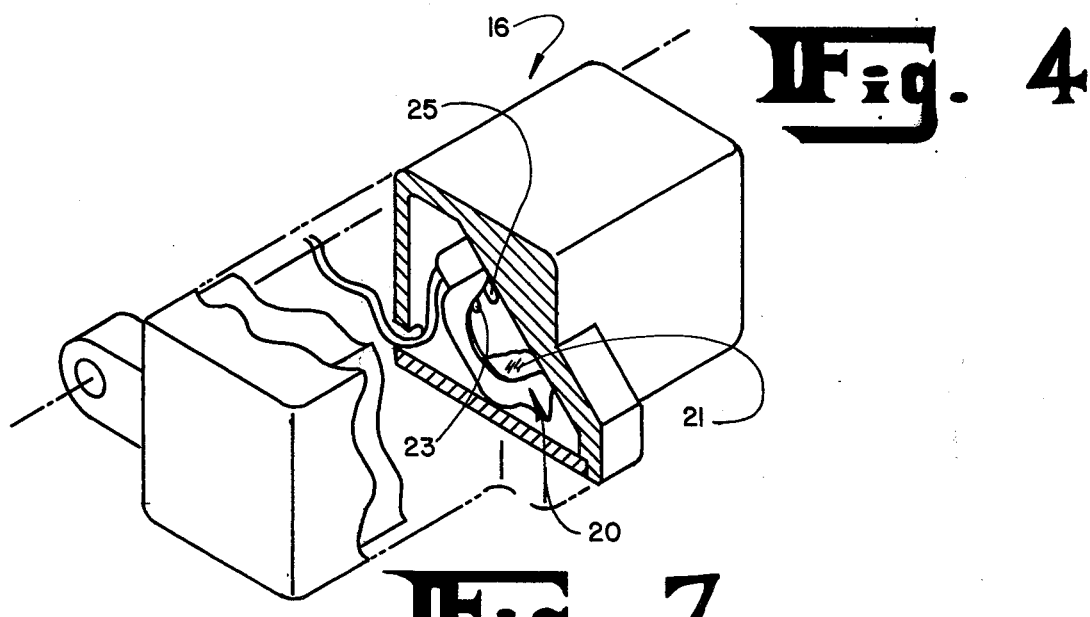

ELECTROACOUSTICAL TELEPHONE ADAPTER

BACKGROUND OF THE INVENTION

The present invention relates to an electroacoustical telephone adapter, and more particularly, relates to an electroacoustical telephone adapter which greatly enhances the quality of telephone communications in a hands-free telephone.

The present invention substantially reduces the "echo" effect of the frequently observed effect that the speaker seems to be "talking in a well or tank" when using the hands-free telephone equipment presently on the market. It is believed that this "echo" effect is caused in conventional hands-free telephones by the use of non-directional microphones which pick up multipath reflections with their attendant phase reinforcements and cancellations. The present invention also provides advantages, inter alia, in the area of switching between the transmit and receive modes of operation.

Telephone adapters for using telephones without the requirement of holding a handset are known in the art. For example, U.S. Pat. No. 3,887,771-Abram N. Spanel discloses a telephone adapter which may be used to enhance the quality and ease of communication by telephone over the then existing prior art. The aforementioned patent of Abram N. Spanel enhances the quality of communication by use of a re-entrant horn which provides acoustic amplification of sounds to be transmitted over the telephone system. The acoustically amplified sounds are directly coupled to the mouthpiece of the handset of a conventional telephone. The present invention provides improvements over the teachings of the aforementioned patent of Abram N. Spanel by combining the directional characteristics of an acoustical horn with switched electronic amplification.

Both the aforesaid patent of Abram N. Spanel and U.S. Pat. No. 2,987,575-Chalfin teach the use of electronic amplification of received sound. In both of the aforesaid patents, the earphone is inductively coupled to an amplifier circuit which amplifies a signal which is then applied to speaker means. The present invention provides improved speech transmission by the use of the combination of a re-entrant horn and electrical amplification circuitry. The re-entrant horn provides directivity of sound reception. The electrical amplification circuitry receives a signal from a microphone mounted at the tail or output portion of the horn, amplifies and frequency shapes the electrical signal. The amplified and frequency shaped electrical signal is then reconverted to sound by a transducer. The transducer is mounted to enable coupling of the sound to the mouthpiece of the handset of a telephone.

SUMMARY OF THE INVENTION

The present invention provides a number of important advantages over the prior art. One of these advantages is increased quality of telephone communication in the transmit direction provided by the combination of a re-entrant horn and electronic circuit amplification means in the transmit path between the output of the horn and the input of the mouthpiece of the handset of a telephone. The re-entrant horn provides directional sound reception characteristics. By use of a horn in accordance with the present invention, sound reception or acquisition is increased in an angular volume in front of the horn axis, while decreasing acquisition of sound outside of this volume. The hands-free telephone used in offices and homes are invariably surrounded by walls and other objects which reflect sound. Therefore, even if the speaker is standing behind the horn of the hands-free telephone (standing in a direction opposite to the direction of directivity of the horn), the speaker's voice is nevertheless picked up by the horn via reflection of the sound off of a wall of the room in front of the horn. However, reflections of the speaker's voice are not picked up from the other walls of the room. Sound reflections from various other objects outside of the directivity pattern of the horn may be eliminated or reduced. Therefore, the directivity characteristics of the horn reduce unwanted reflections or "echoes" in the transmitted signal without seriously affecting the speaker's ability to communicate from any point within the room. By reducing the "echo" effect at the outset, the telephone adapter according to the present invention obviates the need for additional wave-shaping or filtering electronic circuits which would be otherwise necessary to reduce the "echo" effect. A simpler, and therefore more reliable system is the result.

In accordance with the present invention, the desirable aspects of the directivity characteristics of the horn are combined with electronic circuit amplification. The sound at the output or tail portion of the horn is converted by means of a microphone to an electrical signal. The electrical signal output of the microphone is fed to electronic amplifiers for amplification. Frequency shapping is also provided to enhance the characteristics of the transmitted speech. The amplified and frequency shaped signal is applied to a transducer for converting the electrical signal back to a sound wave. The transducer is mounted so that the sound signal may be effectively coupled to the mouthpiece of the handset of a conventional telephone.

In accordance with the electroacoustical telephone adapter of the present invention, electronic amplification is provided in both transmit and receive channels. In the receive channel, amplifier means is inductively coupled to the earphone of the handset of a conventional telephone. This signal is amplified and applied to speaker means. In order to avoid the problem of retransmitting received signals from the speaker means, sometimes referred to as "singing", switch means are provided in both the transmit and receive channels. The switch means are controlled by interrupting means which is responsive to the voice signals in the transmit and receive channels or signal paths. In addition, bias means is provided to normally maintain the transmit channel in an active state.

In order to prevent the transmit and receive channels from switching in response to momentary pauses while a person is speaking, such as between syllables, means for delaying the switching action is provided. In accordance with the present invention, means are provided to reduce this delay when the person using the handsfree phone speaks loudly.

The present invention includes a light emitting diode display which displays the elapsed time of a telephone conversation. This provides the person using the hands-free telephone with a continuous indication of the length of the telephone conversation. The light emitting diode display may be mounted on the re-entrant structure of the horn, approximately in the center of the mouth of the horn. At a predetermined number of times per minute, the light emitting diode display flashes a number corresponding to the elapsed time of a telephone conversation. The flashing of the light emitting diode digital display attracts the attention of the user so that the user is kept aware of the time being consumed in the telephone conversation. Normally, a person looks in the direction in which he is speaking, and has a tendency to look towards the horn of the hands-free telephone which is receiving his voice. This natural tendency is reinforced by the user's attention being attracted to the display causing the user to look in the direction of the horn. Therefore, the flashing of the display has a further beneficial effect on the quality of speech transmission since it tends to cause the user to speak in the direction of the horn. In accordance with the present invention, timing means such as an electronic timer is turned on at the initiation of a telephone call by the operation of switch means. The outputs of the timing means, both an elapsed time signal and a strobe signal, are fed to light emitting diode driver means which in turn drives the light emitting diode display.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 3 is an enlarged view of a light emitting diode digital display for displaying the time duration of a telephone conversation.

FIG. 4 is a view in cross-section taken along line 4—4 of FIG. 3.

FIG. 7 is a view in perspective of member 16, partially broken away to show a mercury switch contained therein in accordance with the principles of the present invention.

DETAILED DESCRIPTION OF THE PREFERRED EMBODIMENTS

Figure 1:
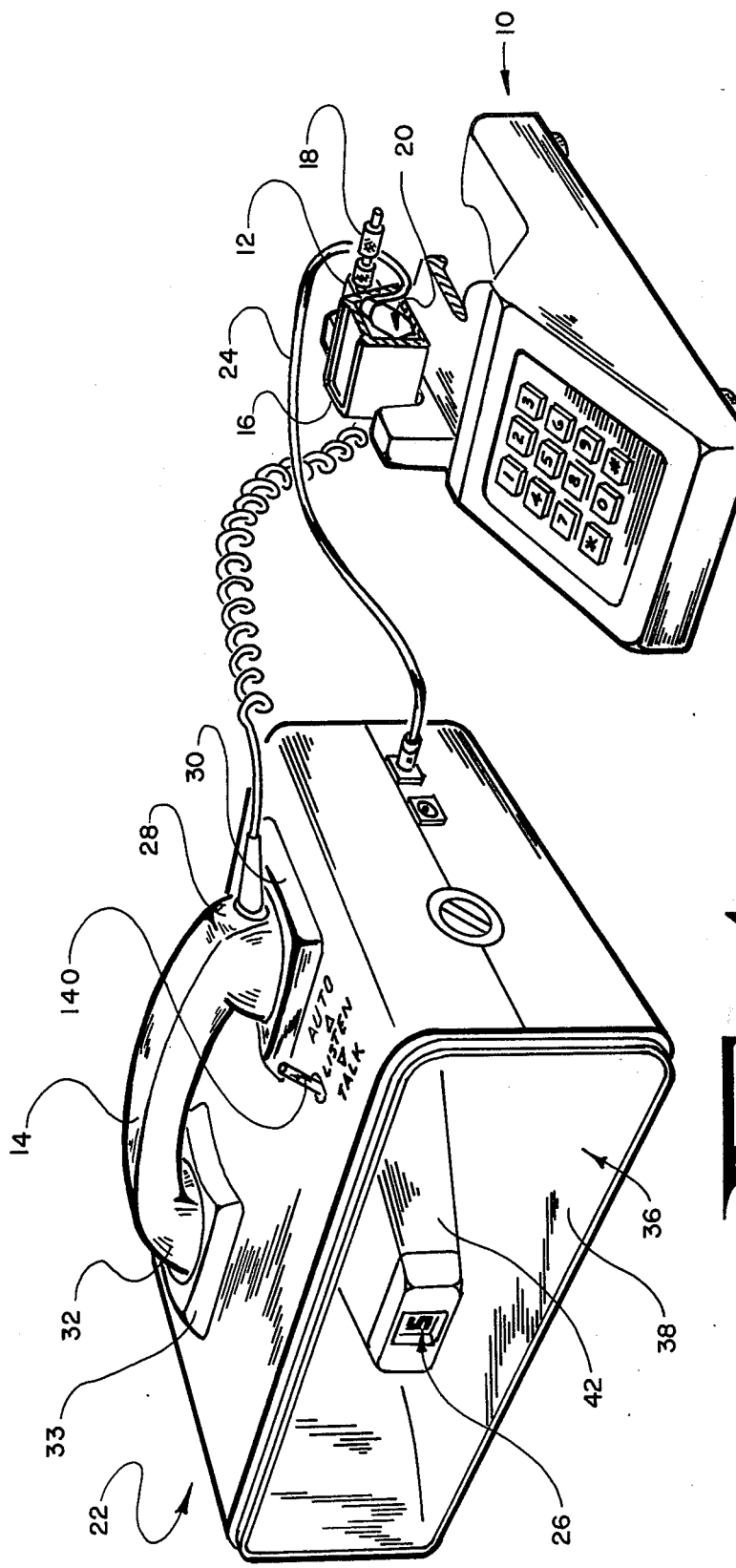
FIG. 1 is a view in perspective of an electroacoustical telephone adapter in accordance with the present invention as used in conjunction with a conventional telephone.

With reference now to the drawings in detail, wherein like numerals indicate like elements, there is shown in FIG. 1 a telephone 10 which is provided with a telephone control apparatus 12. The telephone control apparatus 12 may be a telephone control apparatus for operating the disconnect buttons of the telephone while the handset 14 of the telephone is continually located away from the cradle of the telephone in conjunction with telephone adapter 22 and may be similar to that described in the co-pending application of Abram N. Spanel, entitled Telephone Control Apparatus, Ser. No. 667,335, which was filed on Mar. 16, 1976 and is now U.S. Pat. No. 4,079,196. Briefly, the telephone control apparatus is comprised of a member 16 of a predetermined weight which is pivotally mounted by means of pivot member 18. Pivot member 18 may be mounted between the projections of the cradle. Member 16 is of a predetermined weight sufficient to hold the telephone disconnect switch buttons in a depressed condition when member 16 is in the cradle of telephone 10 as shown in FIG. 1. Member 16 is provided with a cavity for receiving a switch assembly 20, which may be of the mercury switch type. The switch assembly 20 in member 16 is shown in greater detail in FIG. 7. As shown in both FIGS. 1 and 7, the switch is in an open circuit condition with the liquid mercury 21 not forming a closed electrical circuit between electrical contact elements 23 and 25. When member 16 is raised to a vertical position by pivoting on pivot member 18, liquid mercury flows around elements 23 and 25 forming a closed circuit. However, it is understood that the switching from an open circuit condition to a closed circuit condition by the raising of member 16 may be reversed to switching from a closed circuit condition to an open circuit condition by means of the addition of appropriate circuitry in telephone adapter 22, as is well known to those in the art. Furthermore, it is understood that any other suitable type of switch may be used, such as a microswitch.

The electrical contacts of switch 20 are connected to the electroacoustical telephone adapter 22 via electrical cable 24. The raising of member 16 allows the disconnect switch buttons (not shown) of telephone 10 to rise thereby electrically connecting the telephone to the telephone line. Simultaneously, the switch contacts of switch assembly 20 are operated providing a signal to telephone adapter 22 indicating that a telephone call is in progress. This signal may be used to turn on the amplification means in the telephone adapter 22 and initiate timing means, such as timer 60 (FIG. 5), the output of which is displayed on a numerical display, such as light emitting diode display 26.

The mouthpiece or transmitting end 28 of handset 14 may be located in the first cavity of telephone adapter 22 which is sealed by a grommet or seal 30, which may be comprised of a resilient or rubber-like material. The earphone or receiving end 32 of handset 14 may be positioned in a second cavity which is sealed by a grommet or seal 33, which may also be of a resilient rubber-like material.

Figure 2:
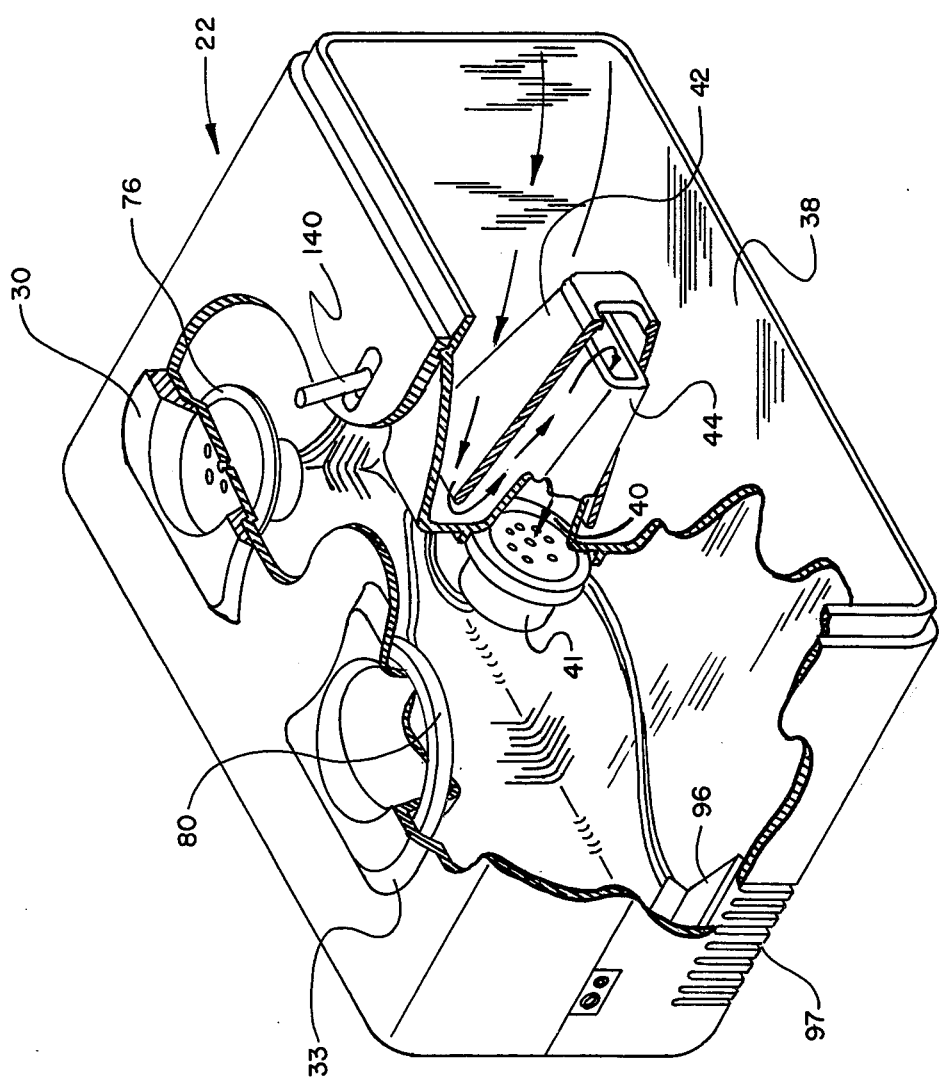
FIG. 2 is a view in perspective of the electroacoustical telephone adapter of FIG. 1 partially broken out, showing, inter alia, the structure of the re-entrant horn.

Referring now to FIGS. 1 and 2 taken together, the telephone adapter 22 is provided with a sound receiving horn 36, which may preferably be of the re-entrant type. The horn 36 may preferably be of the "exponential" type with several re-entrant sections and may preferably be composed of cellulose acetate or other suitable plastic material to provide the best sound transmission characteristics, such as providing a uniform frequency response and the elimination or reduction of undesired resonances. The horn as shown in FIG. 2 may contain an odd number of sections, an even number of which are re-entrant sections, which in combination form a continuous sound passageway of gradually decreasing cross-section extending from the open mouth 38 to the tail or output portion 40. The tail portion 40 may terminate in coupling relationship to a microphone 42. Microphone 41 converts the sound waves into electrical signals for electrical processing as will be described hereinafter in connection with FIG. 6.

The horn 36 has a mouth 38 with an effective area which is relatively large compared to that of the area of microphone 41. This provides a relatively large acoustical gain. The exponential horn 36, including the re-entrant structures 42 and 44, provides an axial acoustical length from mouth 38 to tail 40 greater than the maximum diagonal dimension across the entrance of mouth 38. Horn 36 provides a substantial amount of directivity with a directivity pattern extending in front of horn 36 about the axis of horn 36. The axis of horn 36 is a line extending through the center of re-entrant structure 44. This reception sound pattern effectively results in the rejection of undesired background noise from areas outside of the directivity pattern of horn 36. In other words, reflections of sound from the walls on both sides of and from behind the horn will not be directly received by horn 36.

Telephone adapter 22 is provided with automatically controlled means for switching between the transmit and receive mode of operations, that is, for interrupting the signal paths. These switch means are automatically controlled, at least partially, in response to the energy in the transmit and receive signal paths. The circuitry will be discussed more fully hereinafter in connection with FIG. 6. Telephone adapter 22 is also provided with a manually operable means which includes manually operable switch 140. Manually operable switch 140 may be placed in one of at least three positions corresponding to at least three operating conditions, which are automatic, listen and talk. The switch will remain in either the automatic or listen position when so placed. However, the talk position is spring biased so that switch 140 must be held in the talk position when it is desired to have speech transmitted over the telephone line. The manual switch 140 is provided in order to provide possible enhanced operation where the user finds himself with a bad or noisy telephone line or connection of the telephone company which may possibly result in erratic automatic switching. The user may on occasion desire to use manual switch 140 for other reasons, such as maintaining the hands-free telephone in the receive or listen mode of operation for a period of time.

Light emitting diode display 26 is mounted on re-entrant structure 42 as shown in FIGS. 1 and 2. An enlargement of this structure is shown in FIG. 3 with a cross-sectional view in FIG. 4. The light emitting diode display is mounted within member 46. Member 46 is provided with a nosing cone 48 which tends to shield excess light from the light emitting diode display 26 thereby enhancing the visibility of numbers displayed thereon. The light emitting diode display is provided with a ruby filter 52 in front of light emitting diodes 50. The light emitting diodes are activated by light emitting driver means 54 (FIG. 5) via connector cable 56 and connector 58.

Figure 5:
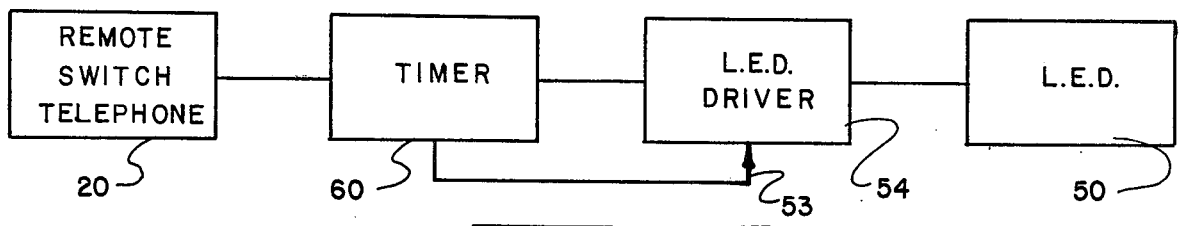
FIG. 5 is a schematic diagram, in block diagram form, of the electronic circuitry of the light emitting diode display.

Referring to FIG. 5, there is shown in block diagram form a schematic of the circuitry for operating the light emitting diode display 26. Remote switch assembly 20 of telephone control apparatus 12 mounted on telephone 10 activates the timing means 60 and resets the timing means to zero when a telephone call is initiated by the raising of member 16. Upon the lowering of member 16, timer circuitry 60 is turned off. The output of timer circuitry 60 is fed to light emitting diode driver circuitry 54 which in turn activates the appropriate diodes of the array of light emitting diodes 50. The timing means also provides a strobe or pulse signal via line 53 to light emitting diode driver circuitry 54 which causes the array of light emitting diodes 50 to flash a number indicative of the elapsed time of a telephone conversation a predetermined number of times per minute, which may preferably be approximately 64 flashes per minute. The strobe or pulse signal may be derived from counters in the timer circuitry 60. This flashing of the light emitting diode display attracts the attention of the user so that the user is kept aware of the time being consumed in a telephone conversation. The flashing of the display has a beneficial effect on the quality of speech transmission since the attraction of the flashing light tends to cause the speaker to face the horn entrance.

Figure 6:
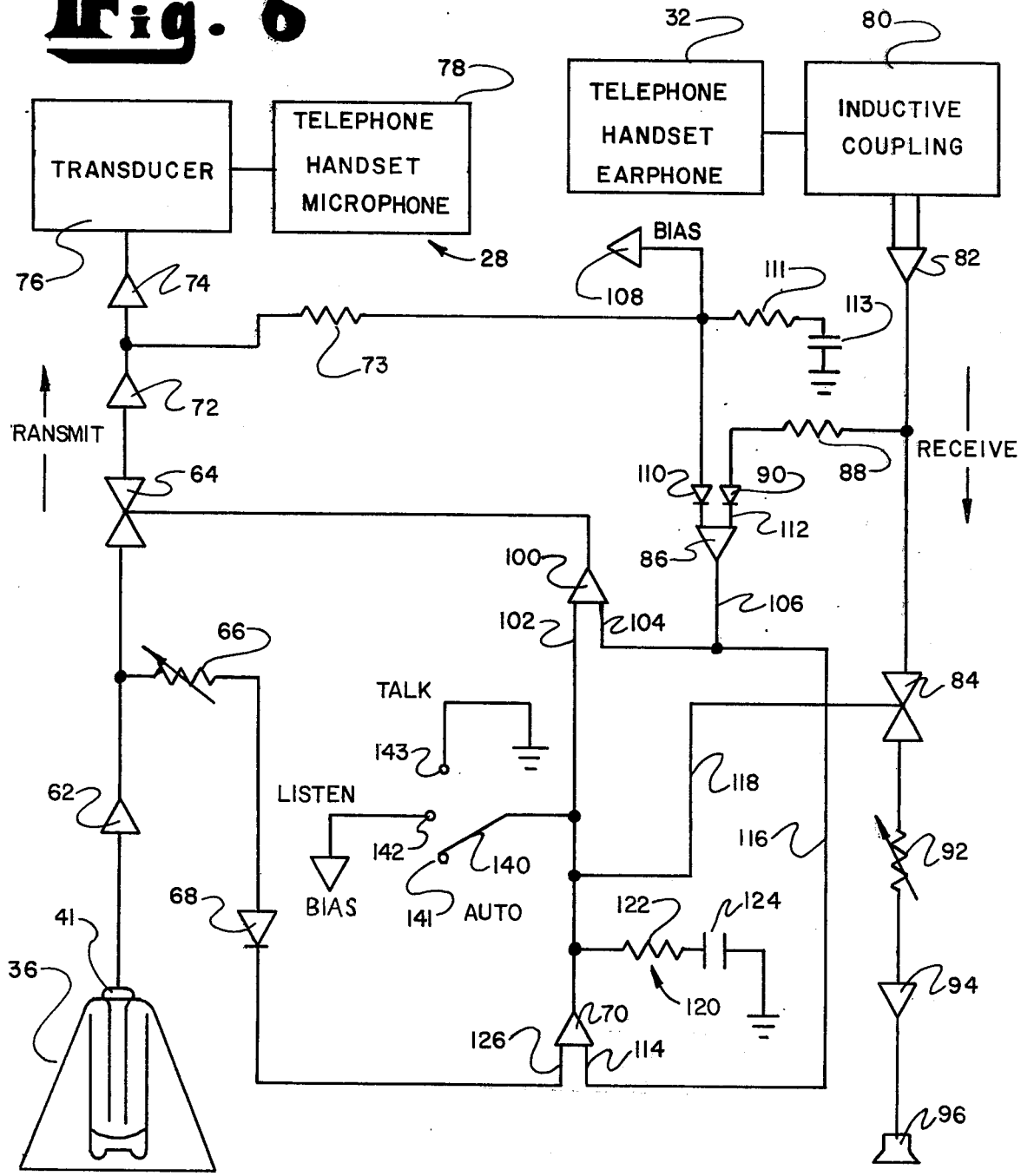
FIG. 6 is a schematic diagram, partially in block diagram form, of the electronic circuitry of the present invention.

Referring now to FIG. 6, there is shown electronic circuitry, partially in block diagram form, of the electroacoustical telephone adapter in accordance with the present invention. Considering first the transmit mode of operation, there is a transmit path which includes horn 36, which may preferably be a re-entrant horn as shown schematically in FIG. 6. The directional sound information, as amplified by the horn, is applied to microphone 41 which converts the sound energy into an electrical signal. The electrical signal output of microphone 41 is applied to amplifier 62. The output of amplifier 62 is applied to switch means, such as electronic switch 64 and via rheostat 66 and diode 68 to one input of an amplifier having at least two inputs, such as operational amplifier 70. Electronic switch 64 may be a field effect transistor, although other suitable zero offset voltage electronic switches may be suitable. Furthermore, electronic switch 64, and electronic switch 84 to be discussed hereinafter, may be connected in the signal path in other manners to achieve the same result. For example, the switch means may be connected in the signal path between a point in the signal path and ground. In this case, the switch means would be considered to be "on" when they were in a non-conductive state. The switch means would be considered to be "off" when they were in a conductive state, as this would result in the shorting of the signal path to ground. Therefore, in the context of the present invention, the switch means being "on" is understood to mean that a signal would pass through and be amplified in the transmit or receive signal paths, respectively. The switch means is considered to be "off" when signal transmission through the signal path is prevented. The output of operational amplifier 62 is frequency contoured by resistive loading of the microphone element which reduces the low frequency response and further enhances the quality of communications in the transmit mode of operation.

Assuming that electronic switch 64 is turned on or is in the conductive state, the output of amplifier 62 is applied to transmit drive amplifier 72 via switch transistor 64. The output of transmit drive amplifier 72 is applied to one of the at least two inputs of comparator 86 via resistor 73 and rectifying diode 110 and to transducer drive amplifier 74 which drives transducer 76. Transducer 76 converts the electrical signal output of amplifier 74 into sound waves. The sound waves are coupled to the microphone 78 of the telephone handset located in mouthpiece 28 of handset 14.

In the receive mode of operation, a receive signal path will include earphone 32 of telephone handset 14 which is inductively coupled by means of inductive coupling 80 to a differential amplifier 82. For example, the inductive coupling 80 may be an earphone transducer provided with an electrostatic shield such as disclosed in U.S. Pat. No. 3,887,771 of Abram N. Spanel. The differential amplifier 82 may have a common mode rejection of 60 db which makes it sensitive to the signals in the earphone 32 of handset 14, but provides effective rejection of extraneous noise signals, such as electrostatic fields in the area. The output of differential amplifier 82 is applied to electronic switch 84 and as the other of the at least two inputs to comparator or differential amplifier 86 via resistor 88 and rectifying diode 90. Electronic switch 84 may be similar to electronic switch 64.

Assuming that the electronic switch 84 is turned on or is in the conductive state, the output of differential amplifier 82 is applied via volume control rheostat 92 to power amplifier or speaker means drive amplifier 94. The output of amplifier 94 is applied to speaker means 96 which is mounted internally in telephone adapter 22. The sound output of speaker means 96 may emanate through openings 97 on the left hand side of telephone adapter 22 shown in FIG. 2.

The means for interrupting the transmit and receive paths in a complementary manner, which includes switch transistors 64 and 84, is at least partially voice controlled. Switch transistor 64 is normally biased to an on condition or conductive state allowing operation in the transmit mode of operation. Electronic switches 64 and 84 may be d-c voltage operated switches, such as field effect transistors. The transmit transistor switch 64 is controlled by the voltage level output of amplifier 100. Amplifier 100 may be an amplifier having at least two inputs, such as operational amplifier as shown, with an inverting input 102 and a non-inverting input 104. In the absence of a received signal being present, in other words in the absence of a signal being inductively coupled from earphone 32, a signal of positive polarity may be applied to input 104 of operational amplifier 100 from the output of comparator 86 via line 106. Comparator 86, which has at least two inputs, generates this positive output signal due to, at least in part, a bias signal supplied by a bias means from bias supply 108 via diode 110. The input to diode 110 is provided with an r-c time constant network comprised of resistor 111 and capacitor 113. It is understood that the polarities described herein are for purposes of illustration, and not for purposes of limitation, and that the circuit herein may be readily designed using opposite polarities. Therefore, under static conditions, without a signal being transmitted or received, the transmit channel or signal path is biased on and the receive channel or signal path is biased off. The biasing on of the transmit channel allows the user of the hands-free telephone to be made aware of any telephone line difficulties before the other party to the telephone conversation so that the user may take appropriate action. The user is made aware due to the fact that he may transmit speech and receive back a response from which he can judge by the quality of the response received whether there are telephone line difficulties with possible attendant switching problems.

If telephone line conditions are not good, or for other reasons, the user may desire to manually control the switching between the transmit and receive modes of operation by means of switch 140, shown in FIGS. 1, 2 and 6. Switch 140 may be a three position switch which may be positioned in an automatic position 141 as shown, in a listen position 142, or manually held in a talk position 143 against a spring bias. Referring to FIG. 6, it may be seen that switch 140 in automatic position 141 does not affect the automatic operation of the switching circuitry of the interrupting means because automatic position contact 141 is floating and has no effect on input 102 of amplifier 100 nor on line 118 connected to the control terminal of receive switch 84. Switch 140 in listen position 142 connects input 102 of amplifier 100 and line 118 to a positive potential causing the turning off of transmit switch 64, by the output of amplifier 100, and the turning on of receive switch 84. Switch 140 in talk position 143 connects input 102 of amplifier 100 and line 118 to ground causing the turning on of transmit line 64, by the output of amplifier 100, and the turning off of receive switch 84.

Upon receipt of a signal in the receive channel from earphone 32, a signal may be supplied via inductive coupling 80, differential amplifier 82, resistor 88 and diode 90 to input 112 of comparator 86. The signal on input 112, if it is of sufficient magnitude, causes comparator 86 to change the state of its output which changes the state of operational amplifier 100 causing transmit switch 64 to be turned off. The output of comparator 86 is also applied to inverting input 114 of operational amplifier 70 via line 116. This causes operational amplifier 70 to change the state of its output. The changed output of amplifier 70 causes the receive electronic switch 84 to be turned on via line 118.

A means for introducing a predetermined time delay is provided in this switching circuitry by r-c time constant network 120 comprised of resistor 122 and capacitor 124. The time constant of r-c network 120 may be selected so that the time constant maintains the telephone adapter in the receive condition for approximately 500 to 700 milliseconds after the cessation of a signal being received in the receive channel from earphone 32. Means for reducing or shortening the delay provided by the time constant network 120 may be provided by a signal on non-inverting input 126 of operational amplifier 70 which is received from the output of amplifier 62 via rheostat 66 and diode 68. In the alternative, rheostat 66 may be eliminated and the time delay controlled by adjusting the gain of amplifier 70. The signal on non-inverting input 126 provides a signal on the output of amplifier 70 which effectively decreases the discharge time of r-c network 120. Therefore, a variable time delay is provided in the interrupting means.

Referring now to the transmit signal path, the transmit signal path is maintained normally on, in the absence of a received signal by means of the bias signal supplied from bias source 108. This bias signal is applied to amplifier 100 via comparator 86 as previously discussed. Upon the receipt of a signal in the receive path from earphone 32, the transmit path is disabled to prevent any local loop acoustic feedback for as long as the receive channel is active. However, during the time that a transmit signal is present, or in other words, when an output signal is generated by microphone 41, a portion of this signal is tapped off via rheostat 66 and diode 68 which tends to more quickly disable the receive channel via the operational amplifier 70, which helps to reduce the delay of the signal on the time constant network 120. In other words, the amplified output of operational amplifier 70 in response to an input on non-inverting input 126 tends to increase the discharge rate of r-c time constant 120 thereby forcing operational amplifier 100 to turn on the transmit channel and forcing the rapid turning off of receive switch 84 via line 118.

It will be apparent to those skilled in the art that various modifications may be made to the telephone adapter described herein within the spirit and scope of the present invention. For example, various equivalent structures may be used in performing the function of the circuitry described herein. In certain instances, polarities have been described in order to provide a concrete illustration of the operation of the circuitry, but it is understood that this is not intended to be limiting, and that some or all of the polarities may be changed by use of circuitry well known in the art. Furthermore, changes may be made in the control circuitry of the interrupting means and the specific means for providing the delay and variation in the delay times.

In view of the above, the present invention may be embodied in other specific forms without departing from the spirit or essential attributes thereof, and, accordingly, reference should be made to the appended claims, rather than to the foregoing specification as indicating the scope of the invention.

What is claimed is:

1. A telephone adapter for hands-free telephony, adapted for use with a telephone handset having structure including an earpiece, comprising:
   a transmit signal path comprising, in series, a microphone, first amplification means, first disabling means and a transducer;
   a receive signal path having means for amplifying sound energy from said earpiece, said receive path comprising, in series, a coupler, second amplification means, second disabling means and speaker means;
   bias means for maintaining said transmit path in an active state when no signals are present; and,
   means for interrupting said circuit paths in a complementary manner, comprising:
      means for introducing a predetermined delay prior to disabling;
      means for shortening said delay in response to a louder sound received by said microphone;
      a comparator having at least two inputs, one of said comparator inputs connected to the output of said transmit path, and another of said at least comparator inputs connected to said receive path; and, third amplification means, having at least two inputs, the output of said comparator being connected to one of said inputs of said third amplification means, another of said inputs of said third amplification means connected to said transmit path, said second disabling means, and said delay means, the output of said third amplification means being connected to the first disabling means.

2. The telephone adapter of claim 1, wherein said transmit signal path further comprises a sound receiving horn, said microphone being operatively coupled to said horn.

3. The telephone adapter of claim 2, wherein the microphone is acoustically coupled to the horn.

4. The telephone adapter of claim 2, wherein said horn has acoustical directivity of sound reception.

5. The telephone adapter of claim 2 wherein said horn is an exponential horn.

6. The telephone adapter of claim 2 wherein said horn is a re-entrant horn.

7. The telephone adapter of claim 2 wherein said horn is an exponential, re-entrant horn.

8. The telephone adapter of claim 1 further comprising a light emitting diode digital display means.

9. The telephone adapter of claim 8 including switch means operable in response to a telephone call, timing means operable in response to said switch means, and light emitting diode driver means responsive to the output of said timing means, for providing an output for energization of the light emitting diode display means.

10. The telephone adapter of claim 1, further comprising:
   switch means operable to a first condition in response to said telephone being connected, and operable to a second condition in response to said telephone being disconnected, said first, second, and third amplification means being operable in response to said switch means being in said first condition; and,
   light emitting diode display means operable in response to said last mentioned switch means being in said first condition.

11. A telephone adapter in accordance with claim 1 including a numerical display.

12. A telephone adapter in accordance with claim 11 wherein said numerical display is lighted.

13. The telephone adapter of claim 1, wherein said third amplification means comprises an operational amplifier.

14. The telephone adapter of claim 1, wherein said third amplification means means comprises first and second amplifiers.

15. The telephone adapter of claim 14 wherein said first amplifier is an operational amplifier.

16. The telephone adapter of claim 14 wherein said second amplifier is an operational amplifier.

17. The telephone adapter of claim 14 wherein said first and second amplifiers are operational amplifiers.

18. The telephone adapter of claim 14, each of wherein said amplifiers has at least two inputs, the output of said comparator being connected to one of said inputs of each of said amplifiers, another of said inputs of said first amplifier connected to said transmit path, another of said inputs of said second amplifier connected to the output of said first amplifier, said second disabling means, and said delay means, the output of said second amplifier being connected to the first disabling means.

19. The telephone adapter of claim 1, wherein said second amplification means comprises multiple amplifiers.

20. The telephone adapter of claim 19 wherein one of said multiple amplifiers is a balanced amplifier.

21. The telephone adapter of claim 19 wherein one of said multiple amplifiers is a differential amplifier.

22. The telephone adapter of claim 1 wherein the first amplification means comprises multiple amplifiers.

23. The telephone adapter of claim 1 wherein at least two inputs of the comparator are driven from rectification means.

24. The telephone adapter of claim 14 wherein the first amplifier is driven from rectification means.

25. The telephone adapter of claim 1 further comprising manually operable means for controlling said first and second disabling means.

26. The telephone adapter of claim 25 wherein the manually operable means generates at least three operating conditions, the first enabling operation of only the transmit path, the second enabling operation of only the receive path and the third enabling automatic operation of either path.

27. The telephone adapter of claim 26 wherein the manually operable means automatically returns from the first operation condition to the third operating condition.

28. The telephone adapter of claim 1, wherein said comparator is a differential amplifier.

29. The telephone adapter of claim 1, further comprising flashing numerical display means.

* * * * *

UNITED STATES PATENT OFFICE
CERTIFICATE OF CORRECTION

Patent No. 4,115,659          Dated September 19, 1978

Inventor(s) SPANEL ET AL

It is certified that error appears in the above-identified patent and that said Letters Patent are hereby corrected as shown below:

Column 2, line 57, delete "handsfree" and insert --hands-free--
Column 4, line 60, delete "42" and insert --41--.
Column 9, line 37, delete "at least".
Column 10, line 10, delete "last mentioned".
Column 10, lines 28 - 29, delete "each of wherein" and insert --wherein each of--.

Signed and Sealed this

Twentieth Day of February 1979

[SEAL]

Attest:

RUTH C. MASON
Attesting Officer

DONALD W. BANNER
Commissioner of Patents and Trademarks